United States Patent [19]

Hisatake et al.

[11] Patent Number: 4,869,184
[45] Date of Patent: Sep. 26, 1989

[54] EMBROIDERING MACHINE HAVING AN ATTACHABLE MEMORY CARD

[75] Inventors: Michio Hisatake; Takeshi Kongo; Hidenori Sasako, all of Tokyo, Japan

[73] Assignee: Janome Sewing Machine Co., Ltd., Tokyo, Japan

[21] Appl. No.: 226,405

[22] Filed: Jul. 29, 1988

[30] Foreign Application Priority Data

Aug. 4, 1987 [JP] Japan ................................ 62-193797

[51] Int. Cl.⁴ ............................................. D05B 21/00
[52] U.S. Cl. .............................. 112/121.12; 112/457; 364/470
[58] Field of Search ............... 112/454, 453, 456, 457, 112/458, 121.12, 121.11; 364/470

[56] References Cited

U.S. PATENT DOCUMENTS

| | | | |
|---|---|---|---|
| 4,672,904 | 6/1987 | Kato et al. | 112/457 |
| 4,703,432 | 10/1987 | Muller | 364/470 |
| 4,742,786 | 5/1988 | Hashimoto et al. | 112/454 X |
| 4,759,302 | 7/1988 | Yanagi | 112/457 X |

Primary Examiner—Peter Nerbun
Attorney, Agent, or Firm—Michael J. Striker

[57] ABSTRACT

An embroidering machine includes RAM which stores temporally the embroidering data read out from a memory card; a device which detects attaching or detaching of the memory card; a buffer circuit which makes and breaks a power source and buses for the memory card; an indicator or warning device which indicates the circuit making and breaking; a device for double checking the data sent from the memory card to RAM; and a device which indicates to the operator the presence of a required card. In the detector of the memory card, determined detecting edge terminals of the memory card are made shorter, and when the card is detached the circuits of the detecting terminals are disconnected earlier than the remaining circuits. When the circuit of the detecting terminal is disconnected, the port of the circuit is rendered to be high impedance by the buffer circuit and the power source to the memory card is disconnected before the terminal of the power source and the bus of the memory card are disconnected, so that if the memory card is slipped out from the embroidering machine while processing "ACCESS" of the memory card, the memory IC is not destroyed.

2 Claims, 5 Drawing Sheets

FIG_1
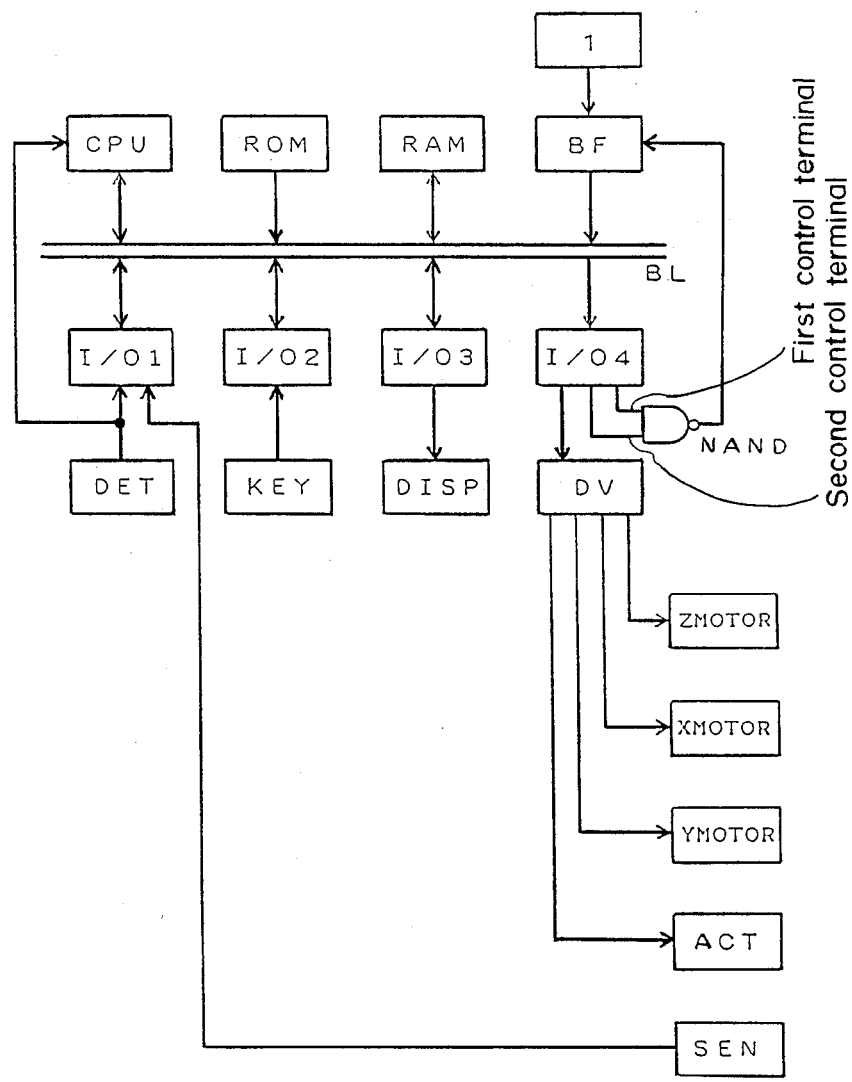

FIG_2
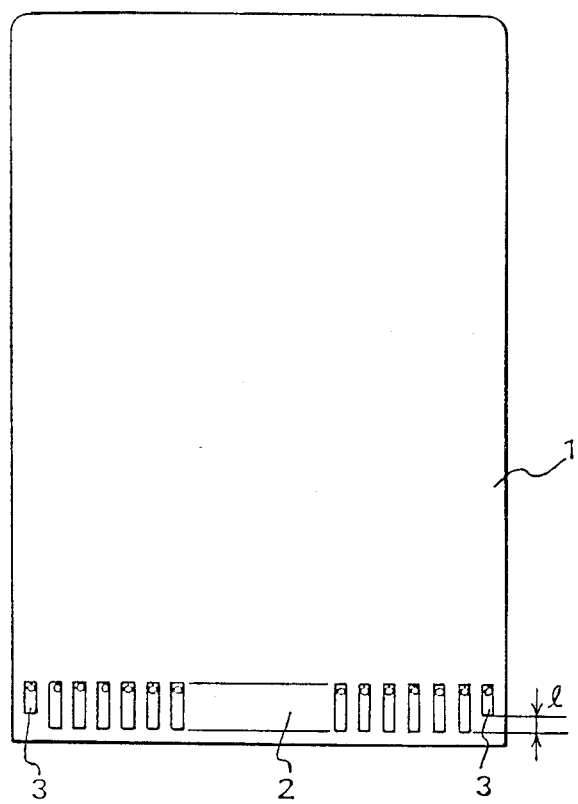
FIG_5
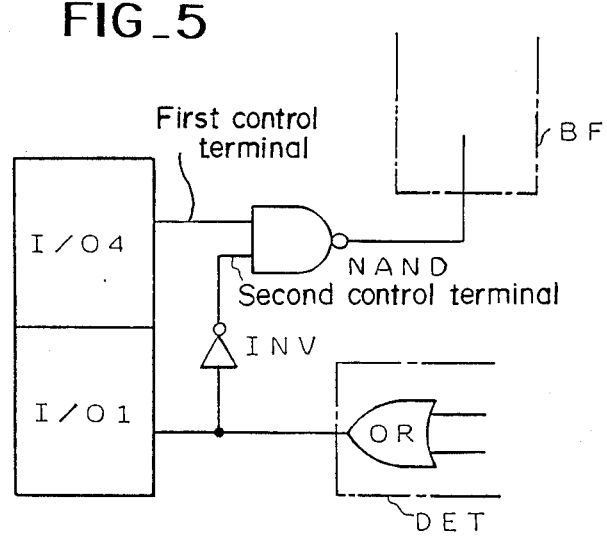

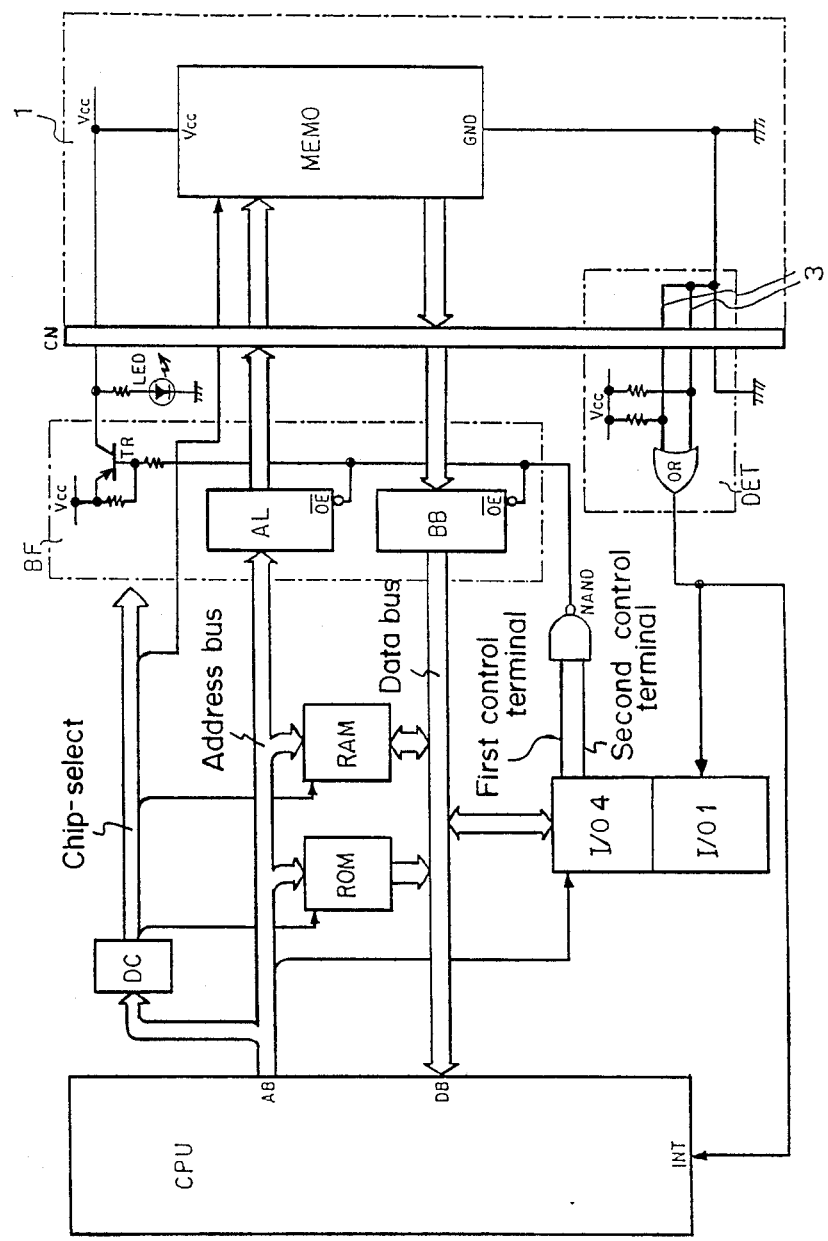
FIG_3

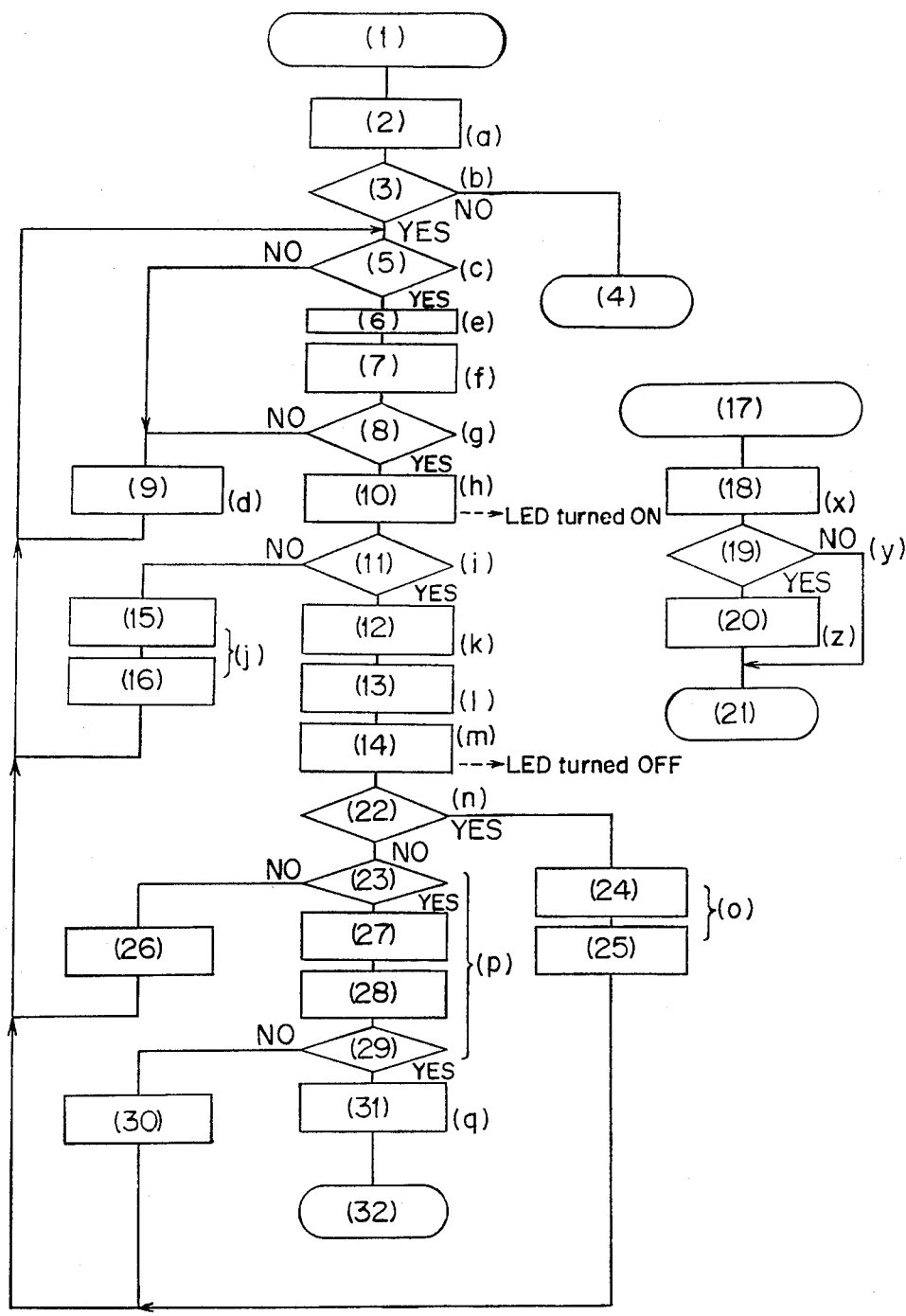
FIG_4

FIG. 4(A)

(1) Routine for reading out embroidering data
(2) Select embroidering characters by selection key
(3) Is Selection key pushed ?
(4) Return to routine for reading out embroidering data (1)
(5) Is memory card attached ?
(6) Soft timer
(7) Set second control terminal at H level
(8) Is memory card attached ?
(9) Indicate in DISP "ATTACH" of memory card
(10) Set first control terminal at H level
(11) Is memory card applied ?
(12) Indicate in DISP "ACCESS" of memory card
(13) Transfer to RAM embroidering data of selected embroidering characters
(14) Set first control terminal at L level
(15) Set first control terminal at L level
(16) Indicate in DISP "EXCHANGE" of memory card
(17) Routine for interruption when memory card is detached
(18) Set second control terminal at L level
(19) "ACCESS" of memory card ?
(20) Set flag for interruption while "ACCESS"
(21) Return from routine for interruption
(22) Does interruption occur while "ACCESS" of memory card ?
(23) Second transferring ?
(24) Reset flag for interruption while "ACCESS"
(25) Clear contents of RAM transferred this time
(26) Set flag showing first transferring
(27) Reset flag showing first transferring
(28) Compare contents of first and second transferrings
(29) Same ?
(30) Clear contents of RAM transferred this time
(31) Indicate in DISP selected and stored embroidering characters
(32) Return from routine for reading out embroidering data

EMBROIDERING MACHINE HAVING AN ATTACHABLE MEMORY CARD

FIELD OF THE INVENTION

The present invention relates to a control of the reading-out of embroidering data for a computer controlled embroidering machine or a computer controlled sewing machine having a memory card attachable and detachable with respect to a machine frame.

BACKGROUND OF THE INVENTION

Economical IC memory has recently appeared on market due to the advancement of LSI technology, and memory cards using IC memory have also been developed.

It is difficult to incorporate in the memory too many sorts of embroidering data such as alphanumeric characters, (i.e. figures and letters), Chinese characters, point patterns and others. In the operator's personal discretion, some characters or patterns are not used at all.

The operator may input predetermined characters or patterns (for example, her or his name or signature) but cannot input point patterns created by the operator.

An embroidering machine has been proposed which stores the embroidering data in the above mentioned memory card. That is, the figures and their punctuation marks (e.g., colon, semi-colon, parentheses, period and so on), the alphabetic letters and their punctuation marks, or the point patterns which are to be used frequently, are stored in one sheet of the memory card of masked ROM type, and the operator's name (Chinese characters or signature) and the point pattern created by the operator are stored in the memory card of programmable ROM type.

In such a manner, the operator may deal with many letters and patterns without problems with respect the space or cost, and it is sufficient for the operator to buy the memory cards only.

The known computer controlled embroidering machine having the memory card or the computer controlled sewing machine (for example, Laid open Japanese patent applications No. 215391/85 and No. 41488/86) have the following disadvantages:

(1) If desired letters or characters to be embroidered are scattered in a plurality of memory cards, they have to be stored in each of the memory cards via RAM, and the power source is turned off after embroidering. The power source turned on after exchanging the memory cards, and the remaining letters are stored.

(2) In order to prevent the memory card from slipping out from the embroidering machine, while processing "ACCESS" of the memory card, a solenoid holds the memory card in place to avoid breakage of the within the memory card or IC memory within the main body to be connected to a bus.

Therefore, it took much time to select and store the letters and it was troublesome to arrange newly created letters in conformity with already created letters. The amount of wasted thread was increased since the embroidering frame was moved during an initial setting operation when applying the electric source. In addition, the machine frame is large sized because it supports the solenoid.

SUMMARY OF THE INVENTION

The embroidering machine according to the present invention includes RAM which stores temporarily the embroidering data read out from the memory card; a device which detects attaching or detaching of the memory card; a buffer circuit which makes and breaks the power source circuit and the bus circuit for the memory card (a port is made high impedance when breaking the circuit of the bus); an indicator or warning devices which indicate to the operator the making and breaking of the circuits; a device which makes a double check of the data sent from the memory card to the RAM; and a device which indicates to the operator the presence of a required card, whereby the letters or characters stored in the plurality of memory cards are selectively loaded and stored and may be embroidered just as the embroidering data of the memory card so as to prevent deformation in the embroidered patterns or danger of interference between the embroidering frame and a stitching needle.

In the detector of the attached or detached condition of the memory card, the detecting terminals (two end terminals) of the memory card are shaped such as to engage corresponding terminals in the detector after the intermediate terminals have been connected to the buffer circuit. When the circuit of a detecting terminal is broken, the port of the circuit is rendered to be high impedance by the buffer circuit and the power source circuit to the memory card is broken before the terminal of the power source and the bus of the memory card are disconnected, so that if the memory card is slipped out from the embroidering machine while processing "ACCESS" of the memory card, the memory IC is not disconnected.

BRIEF DESCRIPTION OF THE DRAWINGS

FIG. 1 is a system block diagram showing a basic structure of one embodiment of the invention;

FIG. 2 is an outer appearance of a memory card;

FIG. 3 is a detailed block diagram of a control circuit for the memory card;

FIGS. 4 and 4A are flow chart diagrams of reading out of the embroidering data and of interruption processing when detaching the memory card; and FIG. 5 is a circuit diagram of a second embodiment, of the control circuit of FIG. 3.

DETAILED DESCRIPTION OF PREFERRED EMBODIMENTS

FIG. 1 shows a system block diagram of a first embodiment of the invention, in which a data bus line (BL) from a central processing unit (CPU) is connected to a read-only memory ROM for storing an embroidering machine controlling program, a random access memory, RAM serving as a temporary memory for embroidering data an input-output device (I/01) for, a sensor (SEN) delivering signals for controlling the embroidering machine and a detector (DET) for detecting attachment and detachment of the memory card, an input-output device (I/02) for receiving orders such as selection of embroidering patterns from a key (KEY) controlled by the operator an input-output device (I/03) for, a display device (DISP) notifying the operator of selected embroidering letters, an input-output device (I/04) for a drive device (DV) connected to a machine motor (ZMOTOR) reciprocating a stitching needle (not shown) vertically, actuators (XMOTOR),(YMOTOR)

moving an embroidering frame (not shown) for expanding a fabric with respect to the stitching needle, and an actuator (ACT) a memory card 1 serving as an attachable and detachable external memory for the embroidering data is connected to bus line BL via a buffer circuit (BF).

For the sake of clarity, an address bus line and a control bus line are omitted.

The detector (DET) also issues interruption signals to an interrupt terminal of (CPU). The buffer circuit (BF) is controlled via a NAND gate (NAND) from the input/output device or port (I/04).

FIG. 2 shows the outer appearance of the memory card 1, in which end contact strips 3 of edge terminal 2 are used as detecting contacts. The length of the detecting contact strips 3 is shorter by l, and are disconnected earlier than other contact strips.

FIG. 3 shows a detailed block diagram comprising the memory card 1 and the buffer circuit (BF) which are interconnected via a connector (CN)—the control bus is not shown.

(LED) is an indicator which shows the "ACCESS" condition of the memory card to the operator, and when the output of the NAND gate (NAND) is L, a transistor (TR) is operated, and a voltage of the power source is applied to IC memory (MEMO) within the memory card, so that the indicator (LED) is lighted.

An address latch (AL) and a bus buffer (BB) are ready for allowing an output, and the memory IC (MEMO) and the bus are connected so as to select any one of (ROM), (RAM) and (MEMO). The selection is made by a decoder (DC) which determines a high bit of the address.

With respect to the detector (DET), when the memory card 1 is detached and the detecting terminals 3 thereof are disconnected from input terminals of the OR-gate (OR), the output terminal of the OR-gate (OR) is made H level before other terminals are disconnected, and (CPU) starts the interrupt ion processing.

The first control terminal of the input-output device (I/04) is controlled to be H/L level in the processing of reading out embroidering data as it will be described later, and the second control terminal is controlled to be H level in the processing of reading out the embroidering data and to be L level in the processing of the above mentioned interruption.

The operation according to the invention will be explained with reference to the flow chart shown in FIGS. 4 and 4(A).

The flow chart shows in detail processing for reading out the embroidering data within the embroidering machine controlling program stored in (ROM) and also processing for interruption when the memory card is detached.

A desired letter to be embroidered is selected at (a) step via a letter selecting key in a keyboard (KEY) of FIG. 1, and if no selection key is pressed the routine is branched to NO of the (b) step.

When a selection key is pressed it is decided, in (c) step whether a memory card is attached by checking an output level of OR-gate (OR) via an input-output device (I/01).

If the level is L, that is, if the memory card 1 is detached the indicator (DISP) indicates that the memory card storing the data of the selected embroidering letter should be attached (for example, the code of the alphabet is distinguished to be 100s or the letters are to be 200s).

The memory card 1 is attached during (e) and (g) steps and the program advances to (h) step a little later.

At (f) step, a second control terminal of NAND-gate (NAND) is rendered to be H level. At this step, the first control terminal is L level (by operation of a previous step), and the memory card 1 is not supplied with the power source, and is disconnected from the bus. When the first control terminal is rendered to be H level at (h) step, the power source is supplied to the memory card 1 and the bus is connected. The indicator (LED) shows the duration of the access of the memory card 1.

A control code stored at a determined address within the memory IC (MEMO) is read out at (i) step so as to check whether or not the memory card stores the data of the embroidering letter selected at this time. If not, the power source to the memory card and the circuit of the bus are disconnected at (j) step, and the indicator (DISP) shows that the memory card should be exchanged. If the memory card 1 is a required one, the indicator (DISP) shows "ACCESS" of the memory card.

A required embroidering data is read out by the code number of the embroidering letter selected at (l) step, and transferred to a required address of RAM. When the transferring is finished, the first control terminal is rendered to be L level at (m) step, and the power source to the memory card 1 and the circuit of the bus are disconnected.

A "interrupting flag while processing the memory card access" checks whether or not the memory card 1 is detached during "ACCESS" of the memory card 1, and if it is detached, this flag is reset at (o) step, and the content of RAM transferred this time is cleared and the program goes back to (c) step.

The embroidering data is twice transferred at (p) step, and if a comparison of the both is the same, the program advances to (2) step. At the first time, the embroidering data is transferred to RAM, and is read out to an accumulator at the second time and following, and is compared with that of the first time. The comparison may be made ($n \leq 2$).

At (q) step, an indication data of the embroidering data transferred to RAM is read out, and the embroidering letter is shown in the indictor (DISP) for the machine operator.

The operator confirms through (c), (d), (i) and (j) steps that the indictor (LED) is not lighted, and the memory card storing the data of the required embroidering letters can be attached without disconnecting the power source, so that it is possible to store the embroidering data in series of the letters scattered in the plurality of memory cards.

A further explanation will be made to the processing for interruption when the memory card is attached to or detached from the embroidering machine.

When either of the input terminals of OR-gate (OR) is H level, that is, the circuit of the detecting terminal 3 is disconnected the central processing unit (CPU) keeps pending the present processing, and operates the processing routine for interruption.

The second control terminal is rendered to be L level at (x) step, and the power source of the memory card and the circuit of the bus are disconnected. The processing time up to this stage would be several $\mu$s, depending upon the speed of (CPU).

In FIG. 2, if $l=1$ mm and the detaching speed is 1 m/sec., 1 ms is taken for moving 1 mm. Therefore, the port of the buffer (BF) is high impedance before the power source and the circuit of the terminal of the bus are disconnected, and the memory IC (MEMO) within the memory card is not destroyed.

At (y) step, the check is made as to whether or not the memory card is processing the access the first control terminal is H or L), and if while processing "ACCESS", the "flag for generating interruption while processing access" is set for interruption by the (z) step.

The provision of two control terminals of the buffer circuit (BF) is necessary because if the memory card is detached between (g) and (h) steps and is inserted at (i) to (l) steps, the memory card is inserted as the power source is connected and IC memory (MEMO) would be destroyed.

If the interruption occurs at the steps from (h) to (l), the memory card is returned to the step (c).

A second embodiment will be explained with reference to a circuit shown in FIG. 5, omitting the same parts as in FIG. 3.

An output of OR-gate (OR) in the detector (DET) during detecting attaching or detaching of the memory card is connected to the second control terminal of NAND-gate (NAND) via an inverter (INV), omitting an interrupting input to (CPU) and the steps of (f), (n), (o), (x), (y) and (z) in FIGS. 4-4(A).

If the memory card is detached while "ACCESS" of the memory card, the output of OR-gate (OR) is made H level and the second control terminal of NAND-gate (NAND) is made L level, so that the output terminal is made H level, and the port of the buffer circuit (BF) is rendered to be high impedance before the power source of the memory card and the circuit of the terminal of the bus are disconnected, and the memory IC (MEMO) in the memory card is not destroyed.

Since the embroidering date are double checked in (p) step of FIG. 4A, and if the memory card is detached while "ACCESS" of the memory card, the embroidering data are again read out by (c) step and the operation is carried out.

As seen from the above, if series of the characters to be emboridered are scattered in a plurality of memory cards, they may be stored at once and embroidered, not requiring a solenoid for checking the detaching of the memory card while "ACCESS".

When the letters or characters in one sheet of the memory card are selected and even if the connected memory card is wrong, the memory card can be exchanged without disconnecting the power source.

Since the both terminals of the memory card are used as the detecting parts of attaching and detaching of the memory card, it is no longer necessary to adjust the position of the detecting part by a micro switch.

What is claimed is:

1. An embroidering machine having a power source, a central processing unit, a random access memory (RAM), a buffer circuit, means for receiving and connecting to the buffer circuit a memory card selected from a plurality of memory cards each having embroidering pattern data stored therein, the buffer circuit being operated to connect a memory card in the receiving and connecting means to buses of the central processing unit so that the embroidering data of the selected memory card may be read out and temporarily stored in the random access memory, and means operated to read out the embroidering data from the random access memory and to control the machine according to the selected embroidering pattern, said embroidering machine comprising:

means (DET) for detecting an attached or detached condition of a memory card in said receiving and connecting means, said detecting means producing a first signal when the memory card is in the attached condition and a second signal when the memory card is in the detached condition;

indicating means (LED) responsive to said first signal of said detecting means to indicate that the memory card is accessed;

display means (I/01, DISP) responsive to said second signal of said detecting means to display a prompt requiring the attachment of the memory card; and control means (I/01, NAND) responsive to said first signal of said detecting means to make said buffer circuit operative, and to said second signal of said detecting means to make said buffer circuit inoperative.

2. The embroidering machine as defined in claim 1, wherein said memory card has a plurality of connecting terminals of which at most two are detecting terminals formed such as to engage said detecting means after the remaining connecting terminals have been connected via said receiving and connecting means to said buffer circuit, whereby said detecting means produce said first signal, and to disengage said detecting means before said connecting terminals are detached from said receiving and connecting means and disconnected from said buffer circuit, whereby said detecting means produce said second signal.

* * * * *